Feb. 10, 1959
R. W. TATE ET AL
2,873,248
METHOD OF CONTROLLING OXIDATION STATE
OF HYDROFORMING CATALYSTS
Filed Sept. 3, 1953
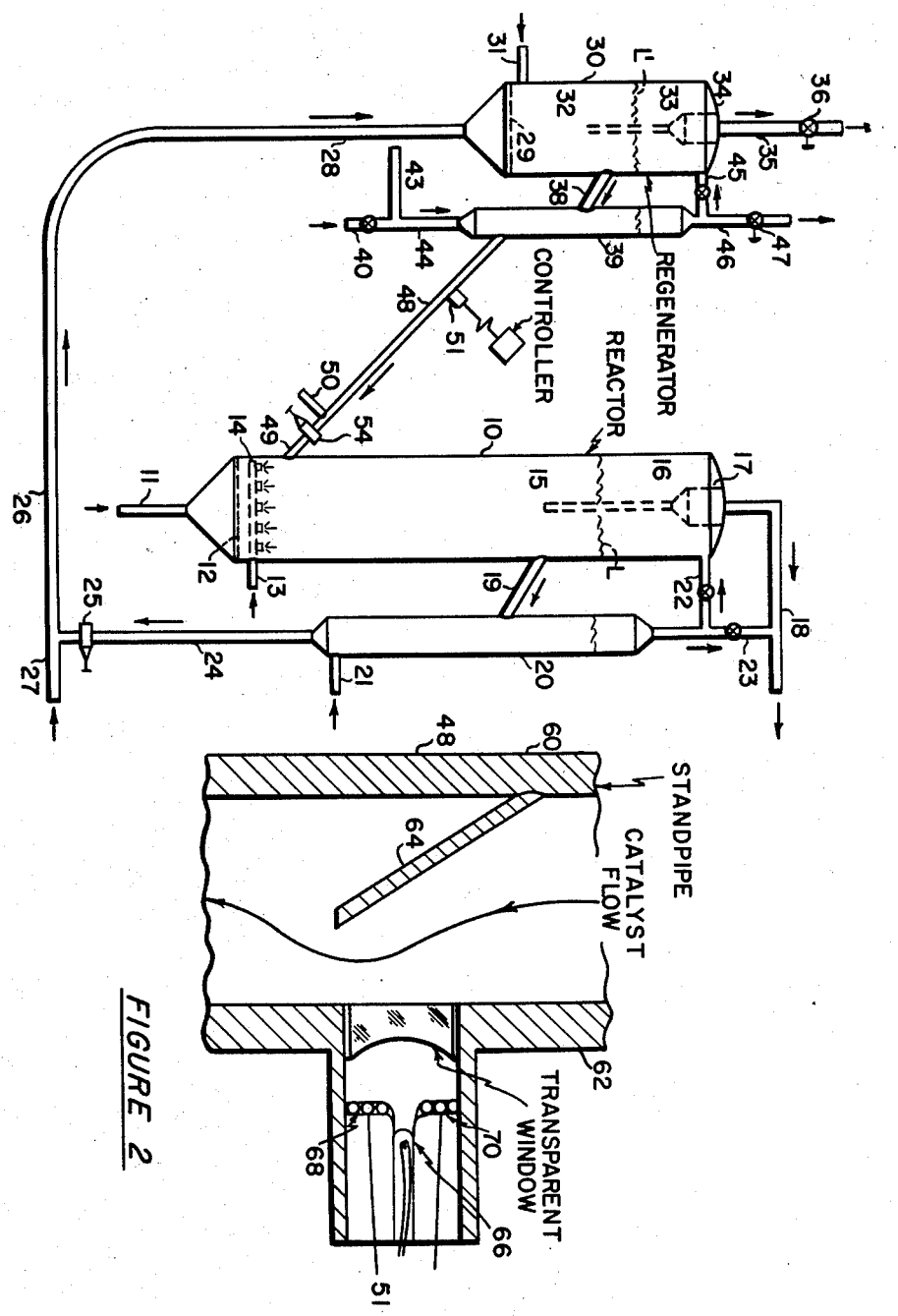

United States Patent Office
2,873,248
Patented Feb. 10, 1959

2,873,248

METHOD OF CONTROLLING OXIDATION STATE OF HYDROFORMING CATALYSTS

Roger W. Tate, Westfield, Walter A. Rex, deceased, late of Westfield, by Virginia C. Rex, administratrix, Westfield, and Charles E. Hemminger, Westfield, N. J., assignors to Esso Research and Engineering Company, a corporation of Delaware Application September 3, 1953, Serial No. 378,328

3 Claims. (Cl. 208—136)

This invention relates to improvements in the hydroforming of hydrocarbons. More particularly, it relates to an improved method of controlling the state of oxidation of hydroforming catalysts.

Hydroforming is defined as an operation in which a petroleum naphta is contacted at elevated temperatures and pressures and in the presence of a recycled hydrogen-containing gas with a solid catalytic material under conditions such that there is not net consumption of hydrogen.

Usually the feed stock boils substantially within the range of from about 150°–430° F. and more particularly 200°–350° F. The light ends, i. e., the material boiling from about 0°–200° F., are not usually subjected to this reaction, for the reason that the virgin naphtha light ends have a fairly good octane rating. The feed or charging stock to the hydroforming reactor can be a virgin naphtha, a cracked naphtha, a Fischer-Tropsch naphtha, a mixture of these, or the like.

Hydroforming operations are ordinarily carried out in the presence of hydrogen or hydrogen-rich recycle gas at temperatures of 750°–1150° F., in the pressure range of about 50 to 1000 pounds per square inch, and in contact with such molybdena type catalysts as molybdenum oxide, chromium oxide, or, in general, oxides or sulfides of metals of groups IV, V, VI, VII, and VIII of the periodic system of elements alone, or generally supported on a base or spacing agent such as alumina gel, precipitated alumina, or zinc aluminate spinel. A good hydroforming catalyst is one containing about 10 weight percent molybdenum oxide upon an aluminum oxide base prepared by heat treating a hydrated aluminum oxide or upon a zinc aluminate spinel.

The chemical reactions involved in the hydroforming process include dehydrogenation of naphthenes to the corresponding aromatics, isomerization of straight chain paraffins to form branched chain paraffins, isomerization of cyclic compounds such as ethylcyclopentane to form methylcyclohexane, and some aromatization, dealkylation and hydrocracking of paraffins. In a hydroforming operation which is conducted efficiently it is possible with the use of a proper catalyst and proper conditions of operation to hydroform a virgin naphtha having an octane number of about 50 to a hydroformate having an octane number of from 95 to 98 and obtain yields of $C_5+$ hydrocarbons as high as 85%.

It has been proposed in application Serial No. 188,236, filed October 3, 1950, now U. S. Patent No. 2,689,823, to effect the hydroforming of naphtha fractions in the presence of a dense fluidized catalyst mass in a fluidized solids reactor system in which naphtha vapors are passed continuously through the dense, fluidized bed of hydroforming catalyst particles in a reaction zone, spent catalyst particles being withdrawn from the dense bed in the reaction zone and passed to a separate regeneration zone where fouling, deactivating carbonaceous deposits are removed by combustion, whereupon the regenerated catalyst particles are returned to the main reactor vessel.

Fluid hydroforming, as thus conducted, has several fundamental advantages over fixed bed hydroforming such as (1) the operations are continuous, (2) the vessels and equipment can be designed for single rather than dual functions, (3) the reactor temperature is substantially constant throughout the bed, and (4) the regeneration or reconditioning of the catalyst may be readily controlled.

It has been found that poor activity and selectivity are often encountered when operating in accordance with the foregoing teachings because of insufficient control of the oxidation state of the molybdena catalyst. During and immediately after the regeneration of a carbonized molybdena catalyst, the valence of the molybdenum is predominantly in its highest, the hexavalent form, i. e., $MoO_3$. The prevention of crystalline molybdena, the optimum activity of the catalyst, and the production of optimum water concentration in the hydroforming reactor are all in turn dependent upon the controlled reduction of the hexavalent molybdenum to a controlled lesser valence (about 5 or on balance 4½ to 5). This type of control has been attempted by a pretreatment of the catalyst prior to reuse in hydroforming utilizing controlled amounts of hydrogen, controlled contact times, and temperatures. It is desirable, however, to have a constant running control of the pretreatment process in order to achieve more nearly the optimum type operation.

This invention provides such a control means. The process comprises controlling the degree of oxidation state of the molybdena catalyst through the utilization of a photoelectric device which detects the changes in the intensity of the reflected light from the catalyst due to the variation in catalyst color with the oxidation state of the molybdena. In more detail, the stream of partly reduced catalyst is circulated past a fixed light source arranged to reflect light from the surface of the catalyst into a photosensitive element. The extent of color change is measured, and the severity of the partial reduction of the molybdena catalyst in the pretreating is instantaneously and continuously controlled by manual or automatic means. This is based on the fact that the color of the molybdena catalyst becomes darker as reduction of the molybdena proceeds, e. g., $MoO_3$ is white or yellow-white and $MoO_2$ is nearly black.

The conditions that are utilized in controlling the reduction of the molybdena catalyst are amounts of reducing gas, time, and temperature of contact.

This invention will be better understood by reference to the drawings, Figure I, a flow diagram of a fluidized hydroforming process, and Figure II, a cross section of a photoelectric device utilized.

In Figure I, 10 is a reactor vessel provided at the bottom with an inlet line 11 for the introduction of hot, hydrogen-rich or recycle process gas. A perforated plate or distributor grid 12 is arranged horizontally within the vessel 10 for insuring uniform distribution of the incoming recycle gas over the entire cross section of the reactor vessel. A separate inlet line 13 connected to a distributor ring 14 or the like is shown for the introduction of naphtha above the grid member 12, although the fresh feed may, if desired, be introduced separately or along with recycle gas below the grid.

The reactor vessel 10 is charged with finely divided hydroforming catalyst particles and the superficial velocity of the vapors and gases passing upwardly through the vessel 10 is so controlled as to form a dense, fluidized, turbulent bed of catalyst 15 having a definite level L superposed by a dilute or disperse phase 16 comprising small amounts of catalyst entrained in gaseous or vaporous reaction products. The reaction products are taken overhead from the reactor, preferably through a cyclone separator 17 or the like for separating entrained catalyst particles which are returned to the dense bed 15 through the dip pipe attached to the bottom of the cyclone separator. Reaction products are conducted via line 18 to suitable fractionating, stabilizing and/or storage equipment.

Catalyst particles are continuously withdrawn from the dense bed 15 through withdrawal conduit 19 and discharged into an external stripping cell or vessel 20. The stripper cell could also be arranged within the reactor vessel as by providing a vertical conduit or cell, preferably extending above level L and provided with a restriction orifice or port for controlling the discharge of catalyst into the stripper cell. A tap 21 is arranged in the lower portion of the stripper for introducing a suitable stripping gas such as steam, nitrogen, scrubbed flue gas, or the like which will serve to remove entrained or adsorbed hydrogen or hydrocarbon materials that would otherwise be carried to the regeneration zone and burned therein. The stripping gas and stripped gases are withdrawn overhead from stripper 20 and passed through line 22 into the upper part of reactor 10 in the event that substantial amounts of catalyst are entrained therein and recovery of such entrained catalyst in the reactor cyclone separator 17 is desired or through line 23 to product outlet line 18 in the event that it is desired to have the stripping gas by-pass the reactor. The lower end of stripping cell 20 is connected to conduit 24 and forms therewith a standpipe for developing fluistatic pressure in the stripped spent catalyst stream sufficient to facilitate its transfer to the regenerator side. A slide valve 25 or the like is provided near the base of conduit 24 to control the withdrawal of spent catalyst from the reactor and if desired or necessary to maintain the catalyst in a fluidized state, one or more gas taps can be provided along conduit 24 for the introduction of fluidizing gas.

The stripped spent catalyst is discharged from the base of the standpipe or conduit 24 into transfer line 26 where it is picked up by a stream of regeneration gas or air supplied through line 27 and conveyed through spent catalyst riser and through perforated plate or grid 29 into regenerator 30 where the carbon is burned off. In order to prevent overheating of the spent catalyst in transfer line 26 and riser 28, it is preferable to use only part of the air necessary for regeneration for conveying the spent catalyst to the regenerator and to add the remainder of the air necessary for regeneration through a separate inlet line 31 or additional lines discharging directly into the regenerator vessel.

The superficial velocity of the regeneration gases through vessel 30 is so controlled as to form a dense, fluidized turbulent bed 32 of catalyst particles and gas having a definite level L' superposed by a dilute or disperse phase 33 in the upper part of the regenerator comprising small amounts of catalyst entrained in the regeneration gases. The regeneration gases are taken overhead from regenerator 30, preferably through a cyclone separator 34 or the like which serves to remove most of the catalyst particles from the gas for return to the dense bed 32 through the dip pipe attached to the bottom of the cyclone. The regeneration gases pass through outlet line 35 and pressure control valve 36 to a waste gas stack.

Regenerated catalyst is withdrawn from dense bed 32 through withdrawal conduit 38 and discharged into pretreating vessel 39. The freshly regenerated catalyst is treated in vessel 39 with hydrogen-containing gas, e. g., hydrogen diluted with nitrogen, methane, mixed light hydrocarbon gases, steam, or similar gases. Recycle gas from the reactor can be used alone or with these diluents. The holding time in pretreater 39 should be between 2 and 100 seconds, depending on the temperature which is used in the regenerator and, therefore, in the treater.

It is the purpose of this invention to provide a means of controlling within rather close limits the catalyst reduction obtained by various combinations of operating variables, time, temperature, gas rate, gas composition, etc.

The pretreating gases are taken overhead from pretreater 39 and withdrawn through outlet line 46 and pressure control valve 47 to suitable storage and/or burning equipment if sufficiently rich in combustibles to warrant recovery and use as a fuel gas or the like.

Pretreated catalyst is withdrawn from pretreater 39 through line 48, which serves as a standpipe for developing sufficient fluistatic pressure in the pretreated catalyst to overcome the pressure drop taken in introducing the pretreated catalyst into the reactor at 49.

In transfer line 48 the partly reduced catalyst is sent past a photoelectric device 51 shown in further detail in Figure II. Device 51 contains a fixed light source. Light is in turn reflected from the surface of the catalyst onto a photosensitive element. The reflected light is roughly proportional to the concentration of hexavalent molybdenum. Thus, as diagrammatically illustrated, the output signal can be used to control a recorder or other indicating device to apprise an operator of the hexavalent molybdenum content of the catalyst or of the valence state of the catalyst. Preferably, however, the electrical signal developed by the photoelectric device is conducted through an automatic control mechanism suitable for operating a valve in conjunction with the control mechanism. The amounts of reducing gas or the level in treater 39 are accordingly regulated. The concentration of hydrogen may also be used as the control method by regulating the hydrogen and diluent flow valves. The preferred method is to regulate the level, and therefore the catalyst time, in treater 39.

It is desirable to purge the catalyst stream passing through conduit 48 of carbon oxides, if present, and accordingly a suitable purge gas such as nitrogen or washed flue gas may be introduced into line 48 at 50. A slide valve 54 is provided in line 48 to control the flow of pretreated catalyst through line 48 into reactor 10.

Figure II presents a more detailed description of the photoelectric device.

Standpipe 48 contains walls 60 and 62 and baffle 64. The direction of catalyst flow is shown. Photoelectric device 51 is sealed into the regenerator catalyst standpipe as shown. In more detail, there is a pinpoint light source 66 surrounded by annular photosensitive elements 68 and 70. A small window 72 of quartz or other transparent temperature and pressure resistant material is sealed into the regenerator catalyst standpipe. In order to overcome reflection from the surface of the window itself, it is recommended that its outside face be parabolic inward so that the surface reflections will be directed to the central light source rather than to the adjacent photosensitive area. As an added precaution, a sheet of polarized glass may be included in the optical path.

It is also recommended that a restriction or baffle be placed in the catalyst line or standpipe (1) to increase the concentration of catalyst particles behind the quartz window, and (2) to increase the "abrasive" action of the particles so that the window will be swept free of deposited material.

The construction of the photoelectric device itself is known, e. g., see "Instrumental Methods of Analysis," Willard, Merritt & Dean, Van Nostrand & Company, 1949, pages 10–31. The pinpoint light source for use in the photosensitive device is of the type that is commercially available and which transmits light in the wave length range of 3000–8000A. The photo sensitive element can preferably be constructed in the form of barrier layer cells, e. g., see "Instrumental Methods of Analysis," page 12. This is more commonly known as the photovoltaic or blocked layer cell construction, which typically consists of a plate of metal, usually copper or iron, upon which has been deposited a layer of selenium or cuprous oxide. Barrier cells respond from the X-ray region up to around 10,000 or 12,000A. Under the illumination utilized, a typical barrier layer cell can develop a current of 100–800 micro amps utilizing resistances of from 1000 to 30 ohms. That is the relationship between illumination and output of a typical barrier layer cell. Utilizing amplifiers known in the art, this is sufficient energy for automatic control of the equipment as stated.

The intensity corresponding to the optimum valence state is determined empirically or through calibration utilizing various criteria, such as activity, selectivity, and measured water content of the reactor effluent. From that point on, the controlling devices are calibrated so as to achieve the desired result.

In the hydroforming process itself the feed stock is preheated alone or in admixture with recycle gas to reaction temperature or to the maximum temperature possible while avoiding thermal degradation of the feed stock. Ordinarily preheating of the feed stock is carried out to temperatures of about 800°–1000° F., preferably about 950° F. The naphtha preheat should be as high as possible while avoiding thermal degradation thereof as by limiting the time of residence in the transfer or feed inlet lines. The preheated feed stock may be supplied to the reaction vessel in admixture with hydrogen-rich recycle gas or it may be introduced separately as shown. The recycle gas, which contains from about 50 to 85 volume percent hydrogen, is preheated to temperatures of about 1150°–1200° F., preferably about 1185° F., prior to the introduction thereof into inlet line 11. The recycle gas should be circulated through the reactor at a rate of from about 1000 to 8000 cubic feet per barrel of naphtha feed. The amount of recycle gas added is preferably the minimum amount that will suffice to carry the necessary heat of reaction into the reaction zone and keep the carbon formation at a satisfactory low level.

The reactor system is charged with a mass of finely divided hydroforming catalyst particles. Suitable catalysts include Group VI metal oxides, such as molybdenum oxide, chromium oxide or tungsten oxide, or mixtures thereof upon a carrier such as activated alumina, zinc aluminate spinel, or the like. Preferred catalysts contain about 5 to 15 weight percent molybdenum oxide or from about 10 to 40 weight percent chromium oxide upon a suitable carrier. If desired, minor amounts of stabilizers and promoters such as silica, calcium, ceria or potassia can be included in the catalyst. The catalyst particles are, for the most part, between 200 and 400 mesh in size, or about 0–200 microns in diameter, with a major proportion between 20 and 80 microns.

Space velocity or the weight in pounds of feed charged per hour per pound of catalyst in the reactor depends upon the age or activity level of the catalyst, the character of the feed stock, and the desired octane number of the product. Space velocity for a molybdenum oxide on alumina gel catalyst may vary, for example, from about 1.5 wt./hr./wt. to about 0.15 wt./hr./wt.

The reduction in the pretreater is accomplished with low concentrations of hydrogen for reasons of control. The catalyst is completely oxidized in the regenerator 30 in order to restore its activity for the subsequent cycle in reactor 10. The resulting hexavalent $MoO_3$ is undesirable in the reactor because too much water is released on its reduction to the more or less equilibrium $MoO_2$ in the reactor. Likewise, there is a tendency for the $MoO_3$ form to give excessive carbon as long as it exists in the reactor.

As stated, it has been found that reduction of the hexavalent $MoO_3$ to an average valence of about 5 avoids these disadvantages. However, if over-reduction is obtained, i. e., some metallic Mo is formed and part of the metal on the catalyst is reduced to a valence of less than 4, the catalyst loses activity. It has been found that this is associated with excessive formation of $MoO_2$ crystals larger than 50 Angstrom units. Consequently, it is necessary to control carefully the degree of reduction so that a major portion of the $MoO_3$ is converted and little or no metal or $MoO_2$ crystals are produced.

The degree of desired reduction is rather difficult to control conventionally by description of the various operating variables, temperature, catalyst time, hydrogen concentration, hydrogen quantity, water concentration, etc. Laboratory analytic procedures are costly and time consuming. The instrument described herewith accomplishes this end promptly and within very narrow limits by giving the operator a visible indication of the valence state and automatically changing the treating time in treater 39 with other variables held constant. As stated, of course, different means of control as the treating gas quantity or composition may be used.

In order to explain the invention more fully, the following conditions of operation of the various components are set forth below and in the examples.

*Conditions in reactor 10*

|  | Preferred | Range |
| --- | --- | --- |
| Catalyst Composition | 10% $MoO_3$ on $Al_2O_3$ | 5–20% $MoO_3$. |
| Temperature, °F | 900–950 | 750–1,150. |
| Pressure, p. s. i. g | 150–250 | 50–1,000. |
| Catalyst to oil ratio | 0.5 to 3.0 | 0.1 to 7. |
| Cu. ft. of recycled gas fed/bbl. of oil | 2,500–7,000 | 2,100–10,000. |
| Concentration of $H_2$ in recycle gas | 60–90 | 50–95. |

*Conditions in regenerator 30*

|  | Preferred | Range |
| --- | --- | --- |
| Temperature, °F | 1,100–1,200 | 900–1,250. |
| Pressure, p. s. i. g | 150–250 | 50–500. |
| Residence time, minutes | 6–30 | 6–180. |
| Fluidizing gas velocity | 0.4 to 1.0 | 0.3 to 2.0. |

*Conditions in pretreater 39*

|  | Preferred | Range |
| --- | --- | --- |
| Holdup time, seconds | 3–10 | 2–100. |
| Temperature, °F | 1,050–1,150 | 900–1,200. |
| Amount of hydrogen, percent theoretical for one valence change | 90–125 | 75–200. |
| Water content of pretreat gas, mol percent | Less than 0.2–0.6 | 0.1–1.0. |

The advantages of this process will be apparent to the skilled in the art. The control attainable insures that catalysts of maximum activity and selectivity can be obtained with a minimum of effort.

It is to be understood that this invention is not limited to the specific examples, which have been offered merely as illustrations, and that modifications may be made without departing from the spirit of this invention.

What is claimed is:

1. In a process for hydroforming petroleum naphthas in contact with finely divided alumina-supported molybdenum catalyst particles in accordance with the fluidized solids technique wherein fouled catalyst is regenerated by burning carbonaceous deposits therefrom at elevated temperatures and then pretreated with hydrogen to partially reduce the molybdenum catalyst from its highest valence to a lower, more catalytically active form, the improvement which comprises the steps of passing the stream of hot partly reduced catalyst from the pretreating step past a fixed light source arranged to reflect light from the surface of said catalyst onto a photosensitive element; measuring thereby the extent of color change in said partly reduced catalyst characteristic of the reduction of molybdic oxide to $MoO_2$ treating the regenerated catalyst with hydrogen under reducing conditions responsive to said color measurements to reduce the molybdenum to an average valency of between about 4.5 and 5.0.

2. The process of claim 1 in which the catalyst is 10% $MoO_3$ on $Al_2O_3$.

3. The process of claim 2 in which the pretreating step is conducted at a temperature in the range of 900–1200° F. for a time interval of 2–100 seconds with an amount of hydrogen equal to 75–200% of the theoretical for one valence change.

References Cited in the file of this patent

UNITED STATES PATENTS

| | | |
|---|---|---|
| 2,044,164 | Gulliksen | June 16, 1936 |
| 2,253,049 | Riche | Aug. 19, 1941 |
| 2,366,372 | Voorhees | Jan. 2, 1945 |
| 2,375,889 | Benning | May 15, 1945 |
| 2,406,166 | Scott | Aug. 20, 1946 |
| 2,534,656 | Bond | Dec. 19, 1950 |
| 2,689,823 | Hardy et al. | Sept. 21, 1954 |
| 2,700,639 | Weikart | Jan. 25, 1955 |
| 2,751,332 | Gornowski et al. | June 19, 1956 |
| 2,762,752 | Hemminger | Sept. 11, 1956 |